Oct. 7, 1930.  S. BUZARD ET AL  1,777,687
DOUBLE HITCH
Filed May 20, 1929   2 Sheets-Sheet 2
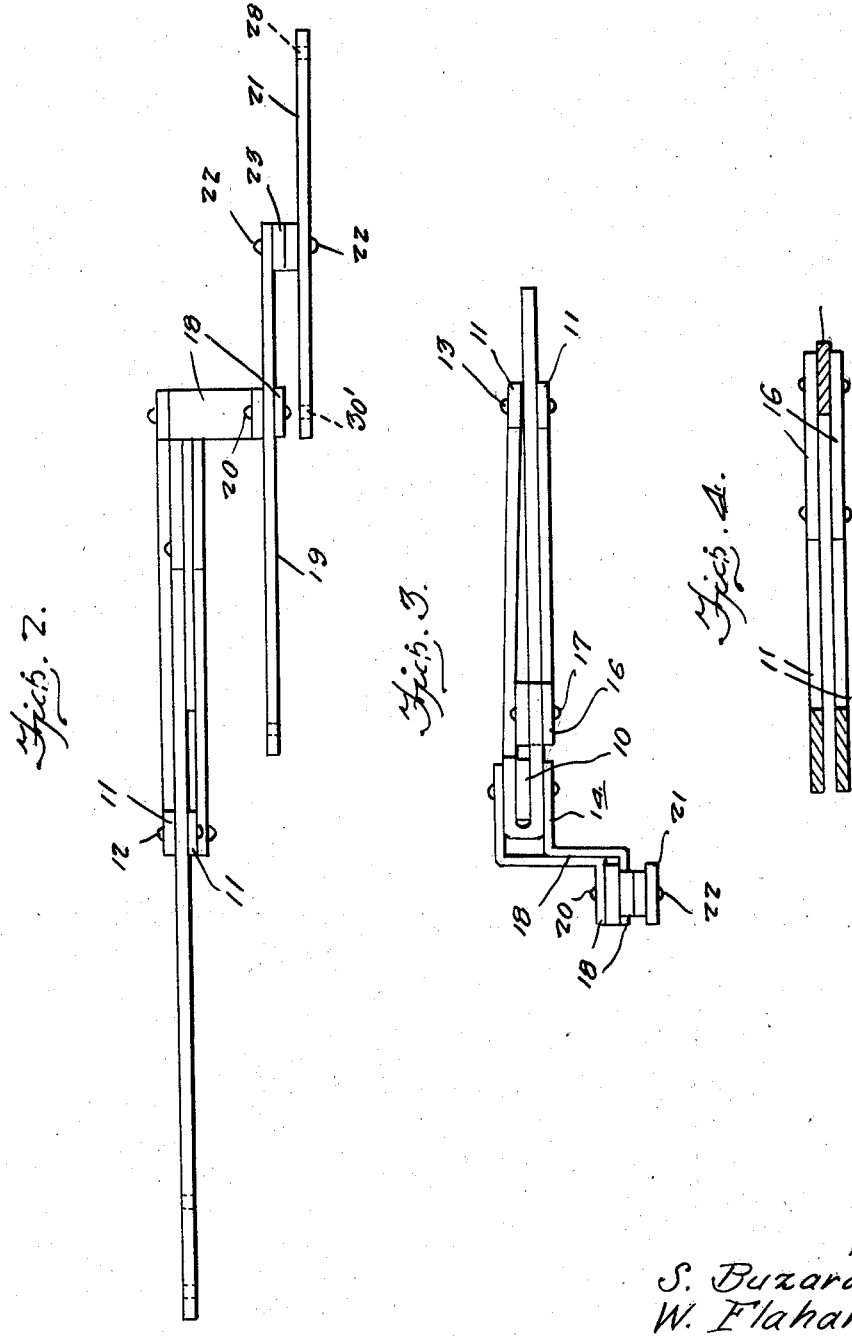
Inventors
S. Buzard
W. Flaharty
By Clarence A. O'Brien
Attorney Patented Oct. 7, 1930

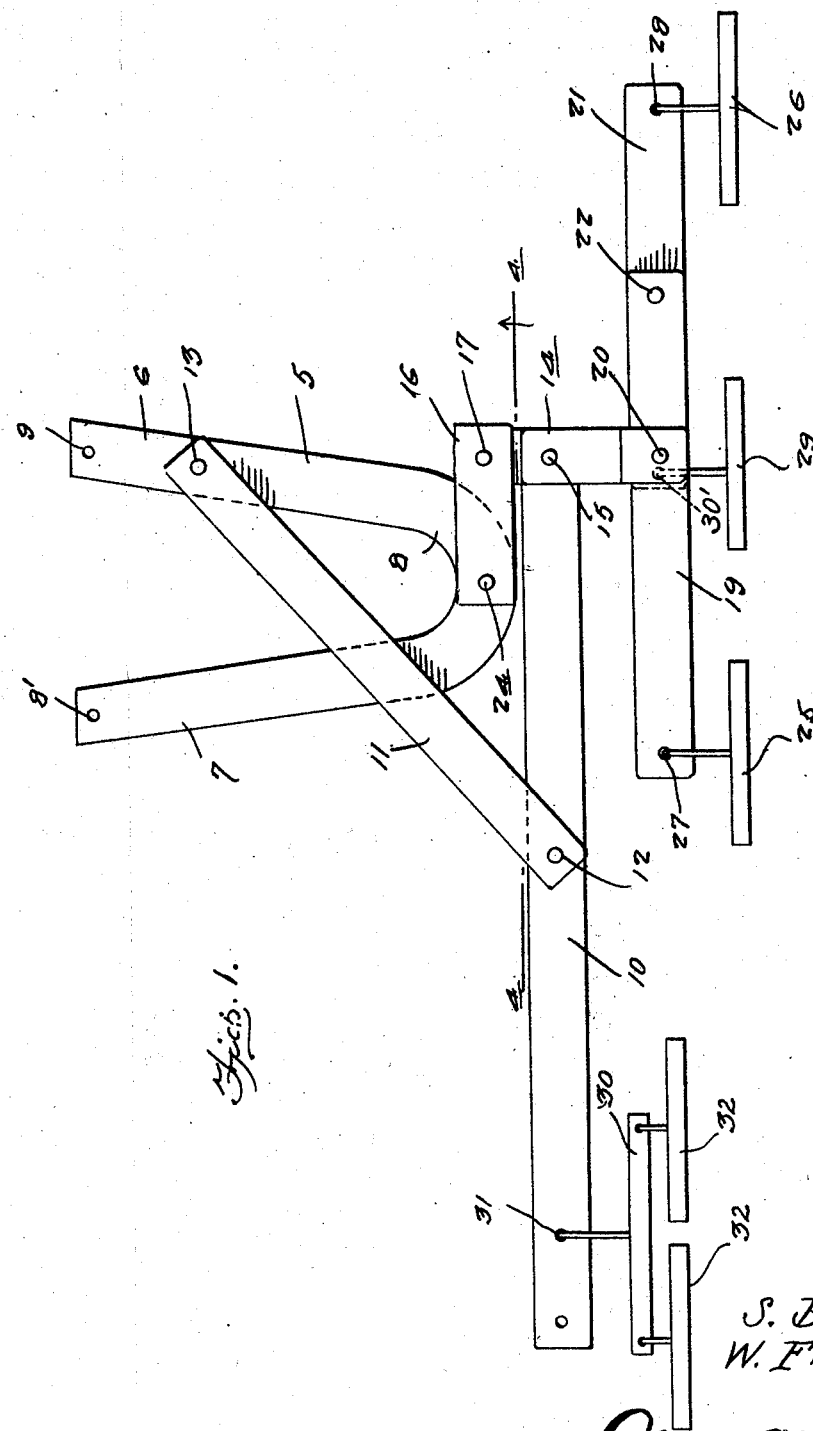

1,777,687

UNITED STATES PATENT OFFICE

SAMUEL BUZARD AND WILLIAM FLAHARTY, OF McCUNE, KANSAS

DOUBLE HITCH

Application filed May 20, 1929. Serial No. 364,634.

This invention relates to a five horse double hitch and an object of the invention is to provide for equalizing the pull of five horses when drawing two plows or other ground working farm implements.

Further objects of the invention are to provide in a manner as hereinafter set forth a device of the character referred to, which is strong, compact and durable, thoroughly reliable in its operation, very simple in its assembly, comparatively light in structure, and comparatively inexpensive to manufacture and operate.

With the foregoing and other objects in view, the invention consists in the novel construction, combination and arrangement of parts as will be hereinafter more specifically described and illustrated in the accompanying drawings, wherein is disclosed an embodiment of the invention, but it is to be understood that changes, variations and modifications may be resorted to, without departing from the spirit of the claims hereunto appended.

In the drawings, wherein like reference numerals denote corresponding parts throughout the several views:

Figure 1 is a top plan view of the device in accordance with this invention.

Figure 2 is a front elevation thereof, and

Figure 3 is a side elevation thereof, and

Figure 4 is a section taken substantially on the line 4—4 of Figure 1 and looking in the direction of the arrows.

Referring to the drawings in detail, 5 indicates generally a substantially U-shaped draw bar having opposite legs 6, 7, and a bight portion 8, and the draw bar is formed of light metal. At the ends of the legs 6, 7, are provided openings or other conventional means 8, 9 for attaching a pair of plows, harrows or the like, because the hitch is particularly adapted to pulling pairs of agricultural implements simultaneously.

The main equalizing bar is indicated at 10 and is formed of strap of light steel or other suitable material. The bar normally is disposed in a plane at right angles to the legs 6, 7, of the draw bar. The bight portion of the draw bar is disposed adjacent one end of the body portion of the main equalizing bar and the other end thereof is spaced a considerable distance laterally of the leg 7 of the drawbar. A pair of parallel spaced straps 11, extending a diagonal direction normally with respect to the plane of the main equalizing bar 10 and are pivoted at their forward ends intermediate the ends of the main draw bar 10. The straps straddle the inner leg 7 of the draw bar.

The other end of the straps are pivoted as at 13 to the outer leg 6 adjacent the end thereof. The pivot at the forward end of the strap is indicated at 12. At the outer end of the equalizing bar, forward and rear extensions 14 are pivoted as at 15, intermediate their ends. A pair of parallel links 16 straddle the rear end of the rear extensions 14 and are pivoted thereto as at 17. The forward extension is formed with a depending arm 18 between the ends of which is pivoted the auxiliary equalizing bar 19. The equalizing bar 19 is pivoted to the depending arm 18, intermediate its ends. A second auxiliary equalizing bar 21 is pivoted midway its opposite ends as at 22, to the outer end of the auxiliary equalizing bar 19 and is spaced downwardly therefrom by a pair of washers 23, circumposed about the pivot and between the equalizing bars. Parallel spaced links 16 straddle the bight portion of the draw bar and are pivoted at their ends as at 24 to the center of the bight portion of the drawbar. When the hitch is used for five horses, single trees 25, 26, are swivelled to the inner end of the auxiliary draw bars 19 and the outer end of the second auxiliary draw bar 21, respectively. The single trees may be attached in any manner as indicated at 27, 28. A third single tree 29 is attached to the inner end of the second auxiliary draw bar 21 as at 30', whereby a three horse aligned pull is spaced forwardly of and parallel to the main draw bar 10.

While the three horse aligned pull is exerted on the pivot 20, equilibrium is had by reason of two horses pulling on the pivot 22, which is offset outwardly from the pivot 20. A double tree 30 is attached as at 31, in any convenient manner to the main equalizing bar 10 and is connected to a pair of single trees 32, whereby a double pull is exerted adjacent the end of the main draw bar. The intermediate point of attachment 31 is offset by reason of the angular pull translated through the straps 11 to the rear of the outer leg 6 on the draw bar 5. The parallel links 16 are to the rear and parallel with the main draw bar 10 and the pull through the extension 14 exerts an angular pressure at the pivot 24, which is offset thereby.

What is claimed is:

A hitch of the character described comprising a U-shaped draw bar including a bight portion, and opposed legs merging with the bight portion, a main equalizing bar normally disposed at right angles to the said legs, an extension pivoted intermediate its ends to one end of the main equalizing bar and projecting forwardly and rearwardly of said bar, means on the other end of the main equalizing bar adapted for attaching a double tree thereto, the rear end of said extension linked to the bight portion of the draw bar, and the forward end of said extension adapted to pivotally receive an auxiliary equalizing bar, a pair of straps diagonally disposed with regard to the main equalizing bar and pivoted at the forward ends to an intermediate portion thereof, and said straps straddling one leg of the draw bar and pivoted at their rear ends to an intermediate portion of the other leg of said draw bar.

In testimony whereof we affix our signatures.

SAMUEL BUZARD.
WILLIAM FLAHARTY.